(12) United States Patent
Prassberger et al.

(10) Patent No.: US 9,177,184 B2
(45) Date of Patent: Nov. 3, 2015

(54) BEAM SHAPE CONTROL DEVICE FOR AN ANTENNA AND ASSOCIATED ANTENNA

(75) Inventors: Klaus Prassberger, Bernau (DE); Benjamin Bien, Rosenheim (DE); Markus Mohr, Rosenheim (DE)

(73) Assignee: KATHREIN-WERKE KG, Rosenheim (DE)

( * ) Notice: Subject to any disclaimer, the term of this patent is extended or adjusted under 35 U.S.C. 154(b) by 0 days.

(21) Appl. No.: 14/008,722

(22) PCT Filed: Feb. 29, 2012

(86) PCT No.: PCT/EP2012/000874
§ 371 (c)(1),
(2), (4) Date: Sep. 30, 2013

(87) PCT Pub. No.: WO2012/130366
PCT Pub. Date: Oct. 4, 2012

(65) Prior Publication Data
US 2014/0306007 A1  Oct. 16, 2014

(30) Foreign Application Priority Data

Mar. 30, 2011 (DE) .......................... 10 2011 015 572

(51) Int. Cl.
| G06K 19/00 | (2006.01) |
| --- | --- |
| G06K 7/10 | (2006.01) |
| H01Q 1/22 | (2006.01) |
| H01Q 1/24 | (2006.01) |
| H01Q 3/00 | (2006.01) |
| G06K 19/077 | (2006.01) |

(52) U.S. Cl.
CPC ...... *G06K 7/10356* (2013.01); *G06K 19/07773* (2013.01); *H01Q 1/2216* (2013.01); *H01Q 1/2225* (2013.01); *H01Q 1/246* (2013.01); *H01Q 3/005* (2013.01)

(58) Field of Classification Search
USPC .............................. 235/487, 492; 340/10, 572
See application file for complete search history.

(56) References Cited

U.S. PATENT DOCUMENTS

| 5,546,090 A | 8/1996 | Roy, III et al. |
| --- | --- | --- |
| 2004/0152492 A1 | 8/2004 | Gray |
| 2007/0008228 A1* | 1/2007 | Yamada et al. ............... 343/702 |
| 2007/0229378 A1 | 10/2007 | Clark |

(Continued)

FOREIGN PATENT DOCUMENTS

| CN | 1399480 A | 2/2003 |
| --- | --- | --- |
| CN | 100372175 C | 2/2008 |

(Continued)

OTHER PUBLICATIONS

International Search Report for PCT/EP2012/000874, mailed May 30, 2012.

(Continued)

*Primary Examiner* — Matthew Mikels
(74) *Attorney, Agent, or Firm* — Nixon & Vanderhye P.C.

(57) ABSTRACT

An improved beam shape control device, and more particularly an improved antenna comprising a beam shape control device, is distinguished by the fact that the beam shape control device (RET, M-RET) comprises reading electronics with an RFID receiving antenna and/or writing electronics with an RFID transmitting antenna, by means of which antenna-specific data can be read from an RFID tag positioned in the region of the antenna.

30 Claims, 5 Drawing Sheets

(56) References Cited

U.S. PATENT DOCUMENTS

2011/0169613 A1* 7/2011 Chen et al. .................. 340/10.4
2013/0127666 A1 5/2013 Zhang et al.

FOREIGN PATENT DOCUMENTS

| | | |
|---|---|---|
| CN | 102136630 A | 7/2011 |
| DE | 600 28 466 | 12/2006 |
| EP | 1 067 626 | 6/2006 |
| WO | WO 02/05383 | 1/2002 |
| WO | WO 02/061877 | 8/2002 |
| WO | WO 2009/102774 | 8/2009 |
| WO | WO 2009/102775 | 8/2009 |

OTHER PUBLICATIONS

Foreign-language Written Opinion of the International Searching Authority for PCT/EP2012/000874, mailed May 30, 2012.
English translation of the International Preliminary Report on Patentability mailed Oct. 3, 2013, issued in corresponding International Application No. PCT/EP2012/000874.
Notification of the First Office Action and Search Report dated Nov. 26, 2014, issued in corresponding Chinese Patent Application No. 201280012498.2.

* cited by examiner

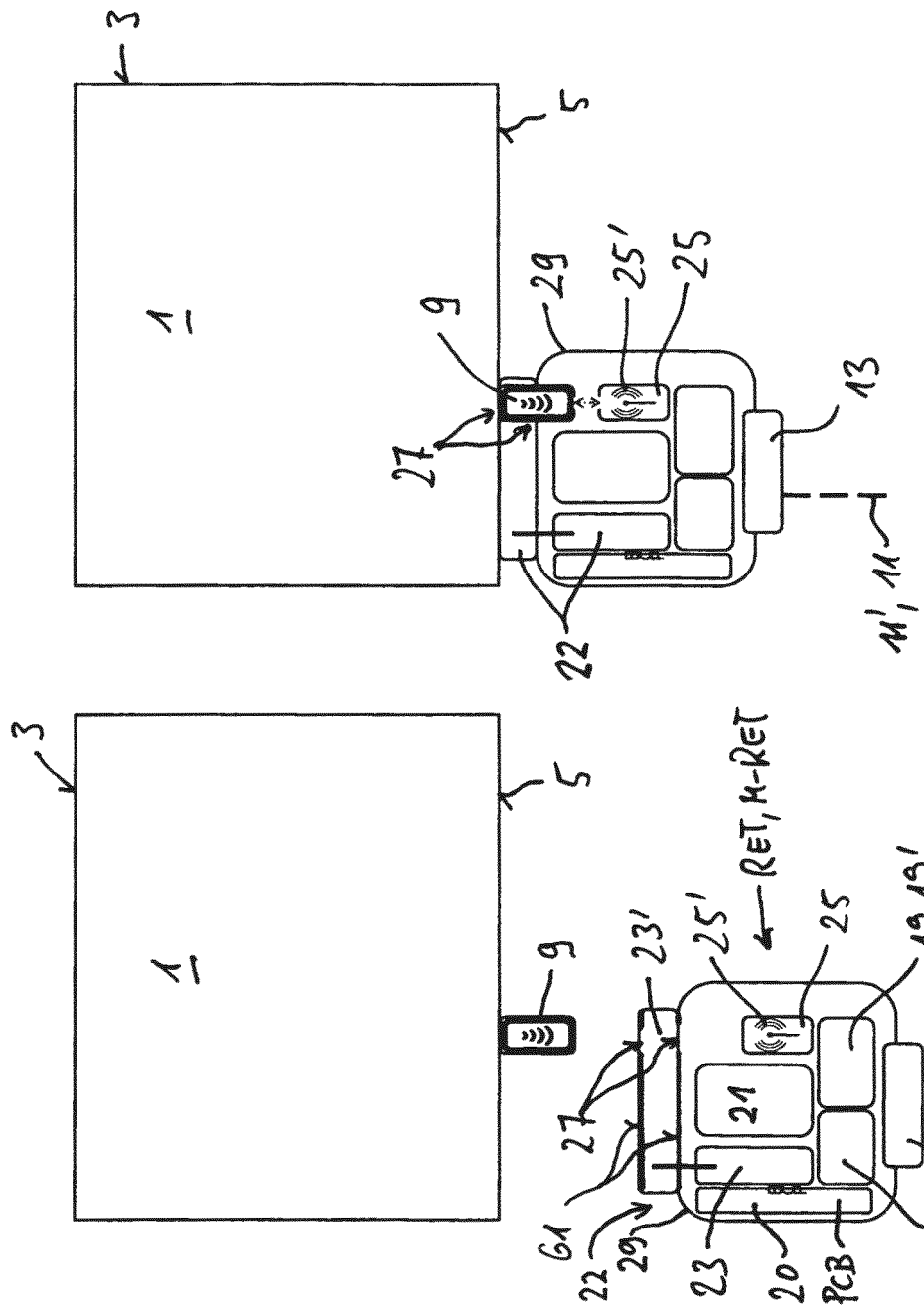

BEAM SHAPE CONTROL DEVICE FOR AN ANTENNA AND ASSOCIATED ANTENNA

This application is the U.S. national phase of International Application No. PCT/EP2012/000874, filed 29 Feb. 2012, which designated the U.S. and claims priority to DE Application No. 10 2011 015 572.4, filed 30 Mar. 2011, the entire contents of each of which are hereby incorporated by reference.

The invention relates to a beam-shaping device.

Beam-shaping devices are used in particular in the field of mobile communications technology, that is to say in mobile communications base stations, to set the major lobe of a mobile communications antenna differently with respect to the beam angle. Depending on the down-tilt angle, a mobile radio cell can be illuminated to different extents and can thus be set.

In beam-shaping devices of this type, that is to say beam-shape control devices, an RET unit is usually referred to, that is to say a remote electrical tilt device, as is known for example from WO 02/061877 A2. By means of a beam-shaping device, which is referred to in the following primarily also as a beam-shape control device or a beam-shaping apparatus (since the corresponding devices of the apparatus themselves do not cause beam shaping but only control it, since the beam shaping is caused by the elements which are active and/or passive in radiation), not only (for example by different settings of phase shifters) can a different down-tilt angle be set in the elevation direction, but the main beam direction and thus the main source of an antenna system can also be set, in particular in an antenna array having a plurality of rows (for example using phase shifters), in the horizontal direction, that is to say with a varying azimuth angle. Finally, by means of a beam-shaping device, not only can a different orientation of the main beam direction of an antenna system be set in the elevation direction and/or in the azimuth direction, but the beam width can also be set differently both in the azimuth direction and in the elevation direction, in order for it to thus be possible to set the half-power width of a main beam lobe (half power beam width). It is likewise also possible to set the mechanical angle of an antenna, specifically roll, pitch and yaw.

In other words, the above-mentioned antennae are generally constructed such that the RET unit can be installed on a mechanical interface provided therefor (for example on the lower mounting flange of the antenna housing), which unit, in addition to an electronics unit, also comprises a motor, which controls the phase shifter integrated in the antenna via a mechanical conversion. The phase change thus carried out has a direct effect on the radiation pattern, that is to say on the down-tilt angle, of the antenna.

By means of RET units of this type, the radiation pattern of multi-antenna systems can in principle be set differently, it being possible to use the above-mentioned RET motors for setting the main beam direction of the antenna not only in the vertical direction (that is to say in the elevation direction for setting a different down-tilt angle) but also in the horizontal direction (that is to say in the azimuth direction), and for setting the half-power width of a major lobe.

It is known in principle that the control unit, that is to say the beam-shape control device in question or the beam-shape control apparatus (that is to say the RET unit), can be arranged having the associated motor inside the antenna assembly, that is to say inside the radome. According to WO 02/061877 A2, it is however proposed that an RET unit of this type be installed outside the radome, preferably directly below a mounting flange of the antenna assembly, and this is advantageous in that an RET unit of this type can also be retrofitted without opening the antenna cover (radome).

Irrespective thereof, it is always necessary for corresponding tuning to be carried out between an RET unit or a multi-RET unit and an associated antenna, which is to be correspondingly controlled with respect to beam shaping via the multi-beam-shaping device.

According to the available prior art, the multi-beam-shape control device (multi-RET), the antenna-specific configuration data and values (configuration data values) and also the additionally required data and values (additional data values) have to be sent to the multi-beam-shaping device by means of what is known as a "primary" via a standardised protocol such as the AISG 1.1 or 3GPP protocol. For this purpose, it is necessary for the fitter, for example, of the multi-beam-shaping system to correctly select said antenna-specific data from a database or another data structure, in order to then communicate said data to the multi-beam-shaping device. A correct assignment has to be carried out between the multi-beam-shaping device and the antenna type, on which the multi-beam-shaping device is to be mounted or has already been mounted.

Finally, reference is also made for example to the 3GPP specifications and also to the complete AISG 1.1 specifications, in which, inter alia, the term "primary station" is used.

What is known as a "primary", that is a "primary station", is therefore, as is known, a base station and particularly a master control unit in the base station.

From the prior publication DE 600 28 466 T2 (corresponding to EP 1 067 626 B1), an antenna system comprising remote control of the antenna beam tilt is known, a storage means being provided for the antenna control apparatus assigned to the antenna. Antenna-specific data are likewise stored in the storage means, such as the antenna address or the down-tilt position.

US 2004/0152492 A1 describes an antenna interface protocol. A tag, which at least comprises the number of the antenna, is assigned to each antenna of the base station.

Finally, U.S. Pat. No. 5,546,090 A describes an RFID tag which is used in the context of calibrating an antenna array.

The problem addressed by the present invention is therefore that of providing an improved beam-shaping device, more particularly a multi-beam-shaping device, and an associated improved antenna system.

The solution according to the invention has significant advantages over conventional beam-shaping and more particularly multi-beam-shaping devices, which are referred to in the following as RETs and multi-RETs respectively.

Within the context of the invention, it is specifically now possible to permanently store both antenna-type-specific and also frequency-band-specific data relating to an antenna system, more particularly in the case of a mobile communications base station, in a storage means which is provided and/or housed or mounted on or in the antenna or the antenna device. Within the context of the invention, an RFID data carrier is used as a corresponding storage device, can be positioned on the antenna, for example outside or inside, and can be clipped on or inserted for example via an opening in the antenna housing or can be attached by means of any attachment device.

Within the context of the invention, a single-beam-shaping device or a multi-beam-shaping device is finally also proposed, which is provided with an integrated read and/or write electronics unit, and this includes a transceiver antenna. Said beam-shaping device and more particularly multi-beam-shaping device, also referred to in the following as an RET or multi-RET unit, can now be mounted outside the antenna or the antenna housing, as described in WO 02/061 877 A2, or inside the antenna housing or can be mounted in part or entirely in a position projecting into the inside of the antenna housing, and preferably such that the transceiver antenna provided in the RET unit comes to rest such that an RFID storage means provided in or on the antenna and having the corresponding information can be read.

Preferably, unidirectional and bidirectional communication is possible between the RET unit and the RFID storage means, referred to as an RFID tag, which is fixed on or in the antenna.

The corresponding data relating to the antenna and/or the antenna type or the converted frequency band are preferably stored permanently (as master data) on the RFID tag.

Since the antenna-specific configuration data and values are stored unambiguously and preferably permanently, said data and values can also be correctly read and further processed in an antenna-specific manner if the RET unit is retrofitted, exchanged or reinstalled. In addition, the individual frequency bands can be unambiguously assigned to the individual RET sub-units, since, specifically, the multi-RET unit consists of a plurality of sub-units, specifically what are known as virtual RET units.

In addition, other data can also be stored on the RFID tag, specifically data relating to the operating parameters such as down-tilt settings, extreme temperatures, adjustment cycles, accelerations etc. The RFID tag can thus function as a log book for the antenna and can be read as necessary. This is particularly advantageous if, for example, an RET unit has to be used, since the new multi-RET unit can read out all the stored operating parameters, and can read these out unambiguously with respect to any antenna on which the RET unit is mounted. Incorrect data being assigned or data being confused is thus precluded.

The invention is described in greater detail in the following on the basis of schematic embodiments, in which, in detail:

FIG. 1a shows a first embodiment according to the invention comprising a beam-shape control device before attachment to an antenna device, which is provided with an RFID tag provided outside the antenna device;

FIG. 1b is a representation corresponding to FIG. 1a with the beam-shape control device attached;

Figure 2B:
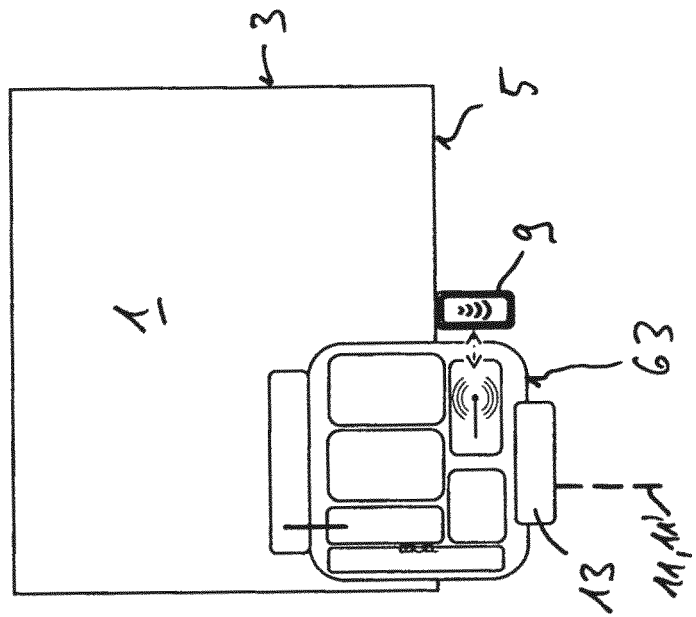
FIG. 2b is a representation corresponding to the embodiment according to FIG. 2a with the beam-shape control device installed, the RFID tag being located outside the beam-shaping device in this case.

An antenna 1 and more particularly a mobile communications antenna 1 is shown in FIG. 1 in a schematic representation, the antenna housing or radome 3 only being indicated schematically. A plurality of antennae and antenna devices are generally provided inside the antenna housing 3, which antennae and antenna devices can be arranged side by side for example in a plurality of rows and can also be oriented differently in the azimuth direction.

The antenna devices (antennae), of which there is generally a plurality, are mounted in front of a reflector in individual columns, usually in the vertical direction or one above the other in the vertical direction due to the components. The antenna devices can send and receive, more particularly in various frequency bands. In this case, not only single- but also dual-polarised antennae are generally used, which are preferably oriented in the manner of an X-polarisation, in which the individual polarisation planes are oriented at an angle of +45° or −45° to the vertical and to the horizontal respectively. Only by way of example is reference made to the wide range of prior publications of such antenna types in respect of how they all are or can be used particularly in the field of mobile communications for base stations.

In an embodiment according to FIG. 1a, an interface, an available connection or at least merely an available mechanical attachment is provided on a mounting flange 5, which is generally provided on the underside of the housing cover 3, in addition to other interfaces, in order to clip on or position a storage means 9 in the form of an RFID tag.

In addition, a beam-shaping device RET, more particularly in the form of a multi-beam-shaping device M-RET, is shown in FIG. 1a before being mounted on the antenna 1, which devices are referred to in the following as an RET unit and multi-RET unit respectively, or RET and multi-RET respectively for short. Since these are therefore control devices and/or setting devices, control apparatus or generally control mechanisms which control, that is to say alter, the beam shaping, said beam-shaping devices or multi-beam-shaping devices are also referred to in the following as beam-shape control devices or beam-shape control apparatus or multi-beam-shaping apparatus.

Said multi-beam-shape control device M-RET comprises a communication interface 13, via which a communication bus 11 for example in the form of a corresponding (for example five-core or eight-core) communication cable 11' (shown in FIG. 1 merely by a dashed line) is directly or indirectly connected to a control apparatus, which is integrated for example in a base station, and generally connected to what is known as a primary. The function of a primary can however also be integrated into parts of a base station, such as into a built-in unit such as a remote radio head, also referred to as an RRH for short. An AISG plug or plug connector, for example, can therefore be used as a communication interface (similarly to in the prior art). The above-mentioned primary, that is to say the base station generally or, for example, a control apparatus (not shown in greater detail) which is integrated into the base station, can communicate with the above-mentioned multi-beam-shape control device M-RET (device-type 0x11) via a suitable protocol, for example an AISG2.0/3GPP protocol. The AISG2.0/3GPP standard specifies, inter alia, the "device-type 0x11". If communication takes place via the AISG1.1 protocol, the M-RET is reproduced on one or more single-RET actuators (device-type 0x01), since the apparatus type 0x11 has not been defined in this standard. The above-mentioned communication interface 13 for connecting a primary is also referred to in the following as a primary communication interface 13.

As mentioned above, the "primary" is therefore a control apparatus which is integrated into a base station. Instead of the abbreviated version "primary", the complete term "primary apparatus" or "primary controller" or "primary station" is thus used at least in some places, that is to say any term as used in the above-mentioned 3GPP specification (3GPP TS 25.461 V7.2.0 (2005-12) Technical Specification) and in the AISG 1.1 specification (Antenna Interface Standards Group Standard No. AISG1: Issue 1.1 of 30 Jul. 2004).

It can also be schematically seen from FIG. 1a that the multi-beam-shape control device comprises, inter alia, an electronics unit 20, for example comprising a printed circuit board PCB, a lightning protection device 17, a voltage supply device 19 (which is also referred to below in some places as an internal power unit 19'), a microprocessor device 21 comprising associated motor drivers and a control device 22, for example comprising an electrical actuator 23 (for example in the form of an electric motor, a stepper motor, a magnetically actuatable adjusting device etc.), which is connected to an associated control and transmission gear 23' comprising mechanical interface assemblies and/or clutch assemblies (not shown in greater detail), can act on the clutch assembly (likewise not shown in greater detail), whereby for example phase shifters inside the antenna housing 1 are controlled via subsequent transmission devices, in order for it to be possible to set a down-tilt angle of the antenna device differently. Other components used for beam shaping can likewise be controlled thereby.

Primarily, however, the beam-shape control device RET is equipped with a read and write electronics unit 25 including an associated RFID receiver antenna and an RFID transmitter antenna 25', whereby it is possible to read information from an RFID tag and optionally also possible to transmit and store new information to an RFID tag. The RET unit RET or the multi-RET unit M-RET are thus at least equipped with a read electronics unit comprising an associated receiver antenna, said electronics unit preferably also being formed as a write electronics unit, as long as a separate write electronics unit is not provided, and the receiver antenna 25' preferably further also serving as an RFID transmitter antenna 25' at the same time. In other cases, the RET unit would also preferably comprise a separate RFID transmitter antenna 25'.

In the embodiment shown, the beam-shaping device RET or M-RET comprises an opening 27 in its housing 29 in its attachment and connection side 61 (by means of which it is attached to the antenna or the radome of the antenna or in this case the antenna flange 5 which may be provided), and this provides the advantage that the beam-shape control device RET thus formed with its housing outside the antenna 1 can be mounted for example on the above-mentioned mounting flange 5 (which is generally provided at the bottom in a mounted antenna), in order to adjust the transmission and adjusting device, provided in the antenna housing 3, and the phase shifter in a known manner via the integrated electric motor 23 of the control device 22 and optionally via the gear assembly 23' such that a different beam angle or other elements used for beam shaping can be set. When attached, the RFID tag 9 which is provided on or clipped onto the antenna preferably engages in the housing 29 of the RET unit via the openings 27, and thus comes to rest directly adjacent to the transceiver antenna 25'. In this case, the RET unit is thus mounted and connected on its attachment and connection side 61 (on which the gear 23' is provided) to the outside of the antenna housing 3, preferably to a flange 5 on the bottom of the antenna housing 3, on which flange other mechanical and electrical interfaces are also formed.

In the context of the invention, RFID tags 9 can be used which for example do not have a separate energy storage means. For the supply of energy, the RFID tags could not only be mechanically retained on the antenna housing on a corresponding interface, but also could be electrically connected such that the integrated chip thereof is supplied with energy, more particularly also to maintain the correspondingly stored data in a permanently stored state. It is, however, also possible for the above-mentioned RFID tag 9 to be positioned solely mechanically on the antenna or in the region of the antenna, on the outside of the antenna housing or inside the antenna housing (as shown in the following), and for the tag to obtain energy for reading or also for storing new information from the RFID receiver antenna and/or transmitter antenna 25'. This means sufficient energy is transmitted by the receiver and/or transmitter antenna 25' for the RFID tag to be able to reproduce the stored data upon request, that is to say to be able to read and transmit from its internal storage means.

A read and also a write process between the RET unit and the RFID storage means 9, that is to say the RFID tag 9, which is fixed to or in the antenna 1, can preferably be handled thereby. In principle, the antenna 25' in the RET unit is used not only as a receiver antenna, but also as a transmitter antenna. A separate transmitter antenna is not generally required. In this case, information can also be transmitted to and stored on the RFID tag 9, as is explained in greater detail below.

Figure 2A:
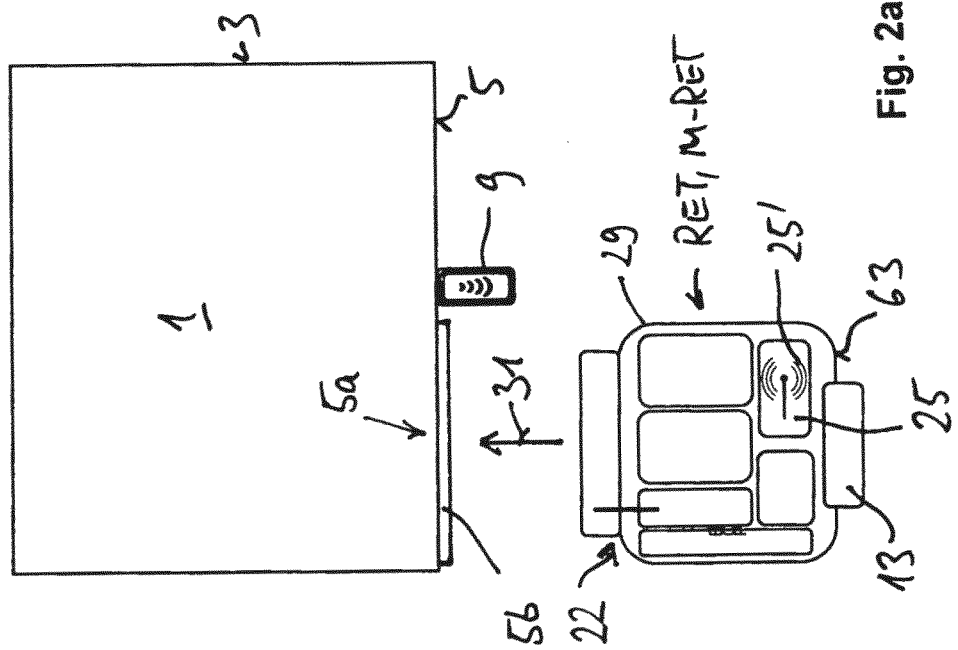
FIG. 2a shows an embodiment which is slightly modified with respect to FIG. 1a and includes a beam-shape control device in which the integrated transceiver antenna is housed at a different point in the housing.

In the embodiment according to FIGS. 2a and 2b, the configuration is such that an opening 5a which can be closed by a cover 5b is provided for example on the antenna housing 3 and preferably on the mounting flange 5, said opening preferably being in the form of a removable or unscrewable housing cover, which makes it possible for the RET unit to be inserted into the antenna housing over a partial length (or wedge height) and to be positioned therein in a correctly functioning manner, the RFID receiver antenna 25' provided in the RET unit preferably in the form of the RFID transceiver antenna 25' being, in this case, positioned inside the RET housing 29 opposite to the insertion direction 31, preferably adjacent to the connection side 63. In this case, too, the receiver or transceiver antenna 25' thus formed comes to rest directly in the RFID tag which is mounted on the outside or the underside 63, that is to say the communication connection side 63, of the antenna housing 3, in order to ensure optimal communication between the transceiver antenna 25' and the RFID tag 9.

Figure 3B:
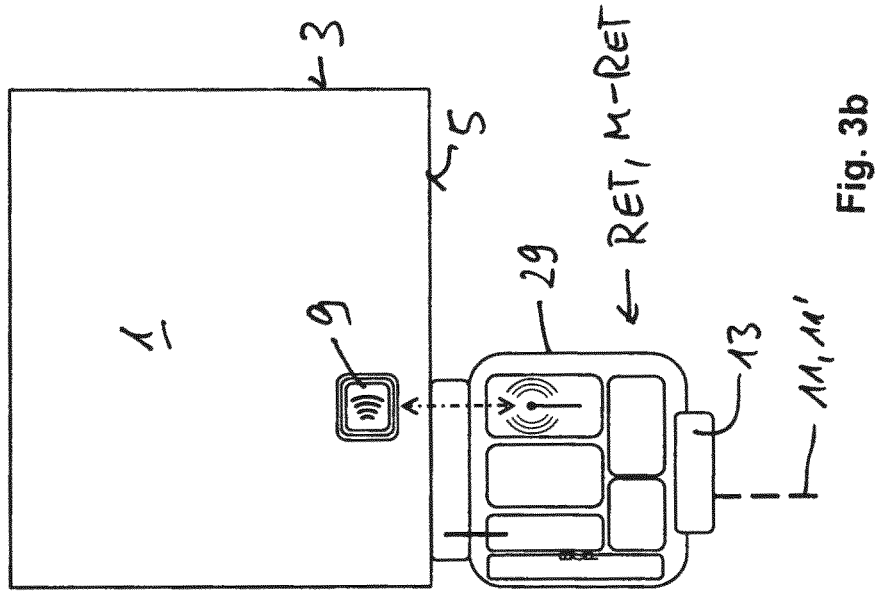
FIG. 3b is a representation corresponding to FIG. 3a after the beam-shape control device has been attached to the antenna housing.
Figure 3A:
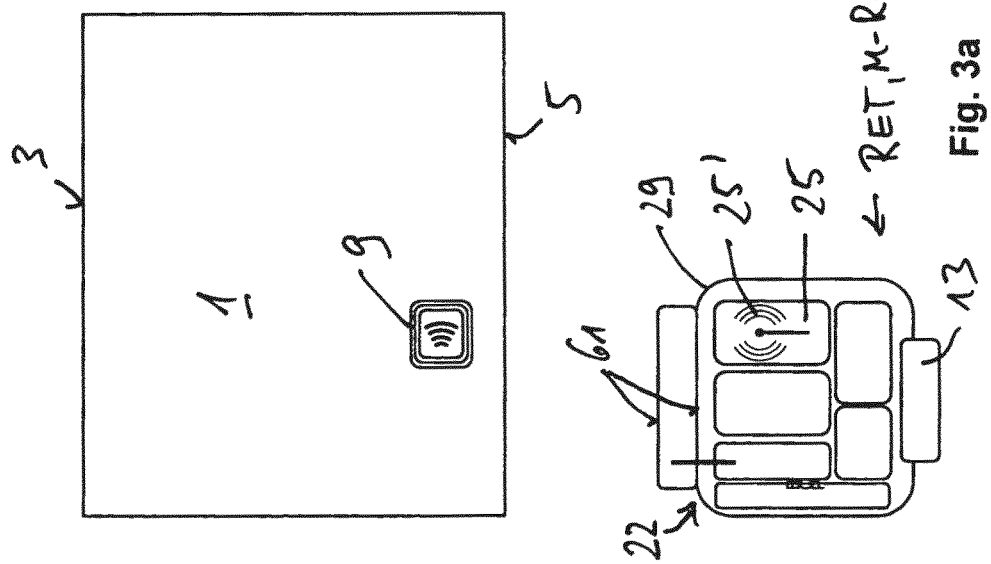
FIG. 3a shows a modification to the preceding embodiments, wherein the RFID tag is housed inside the antenna housing, before the beam-shape control device is attached.

In the variant configurations according to FIGS. 3a and 3b, the RET unit is attached to the antenna 1 in a similar manner to in the embodiment in FIG. 1, the RFID tag 9 being housed, in a manner departing from the embodiment according to FIG. 1, inside the antenna housing 3, preferably directly adjacent to the antenna flange 5 on the housing 3. Optionally, an opening for communicating with the tag is provided in the housing 29 of the RET or M-RET unit, or an opening provided here is closed by a cover which is permeable to the transmitter and receiver beam between the RFID transceiver antenna 25' and the RFID tag 9.

Figure 4B:
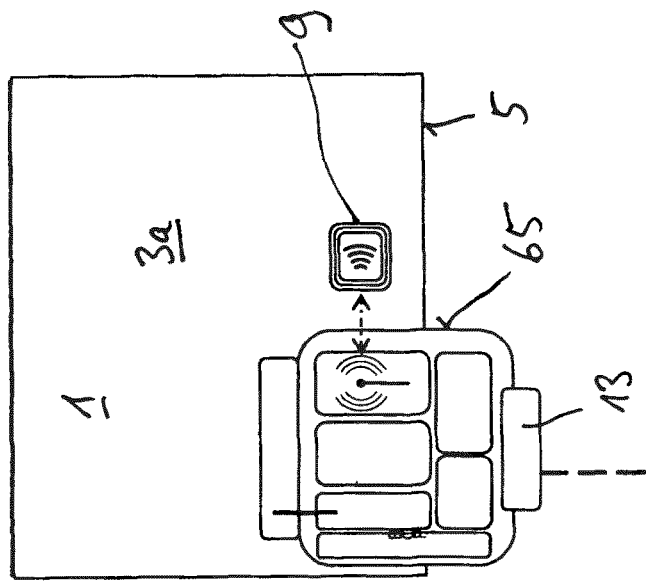
FIG. 4b is a representation corresponding to FIG. 4a after the beam-shape control device has been installed in the antenna.
Figure 4A:
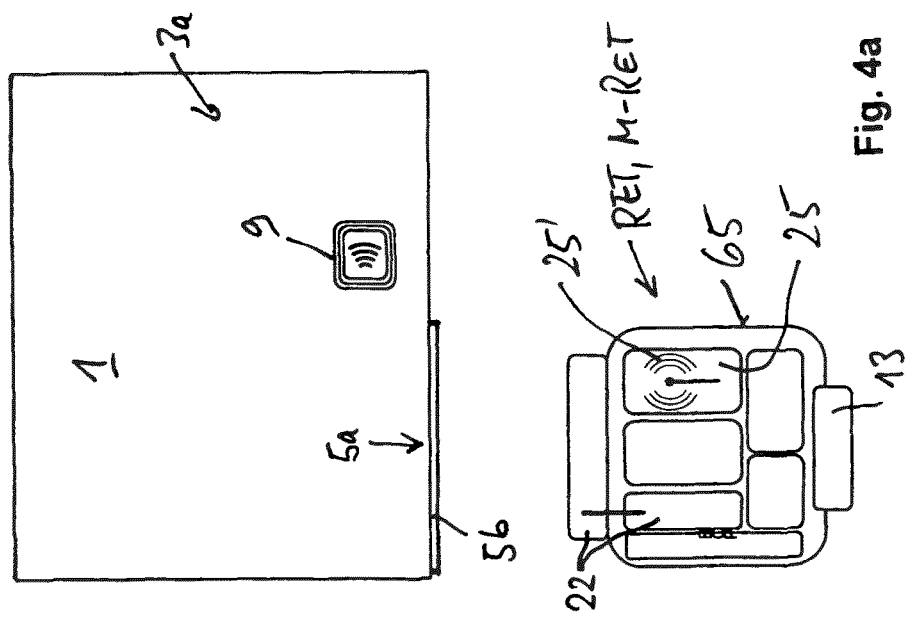
FIG. 4a shows a further modification to the embodiments according to FIGS. 1a, 2a and 3a before attachment.

In an embodiment according to FIGS. 4a and 4b, it is provided that, differing from the embodiment according to FIGS. 3a and 3b, the RET unit and more particularly the multi-RET unit are not mounted completely outside the antenna housing, preferably on the underside thereof, but rather engage and are mounted in the inside 3a of the antenna housing 3 over a partial height or partial length. For this purpose, the cover 5b is removed again in the region of the flange 5, and the housing 29 of the multi-RET unit is pushed in the opening 5a of the antenna housing 3 over a partial height. In this case, the RFID transceiver antenna 25' is also likewise positioned directly adjacent to the RFID tag 9 housed in the antenna, and in the embodiment shown is positioned adjacent to a side wall 65 in the housing 29 of the RET or multi-RET unit.

Figure 5B:
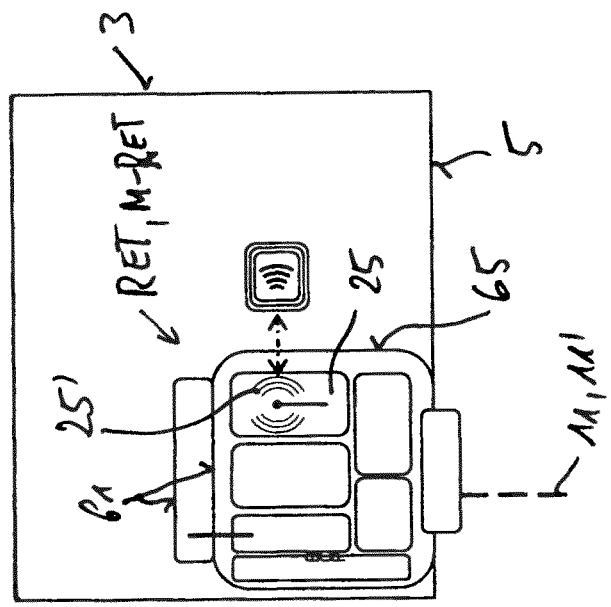
FIG. 5b is a representation corresponding to FIG. 5a after the beam-shape control device has been inserted in the antenna, that is to say in the antenna housing.
Figure 5A:
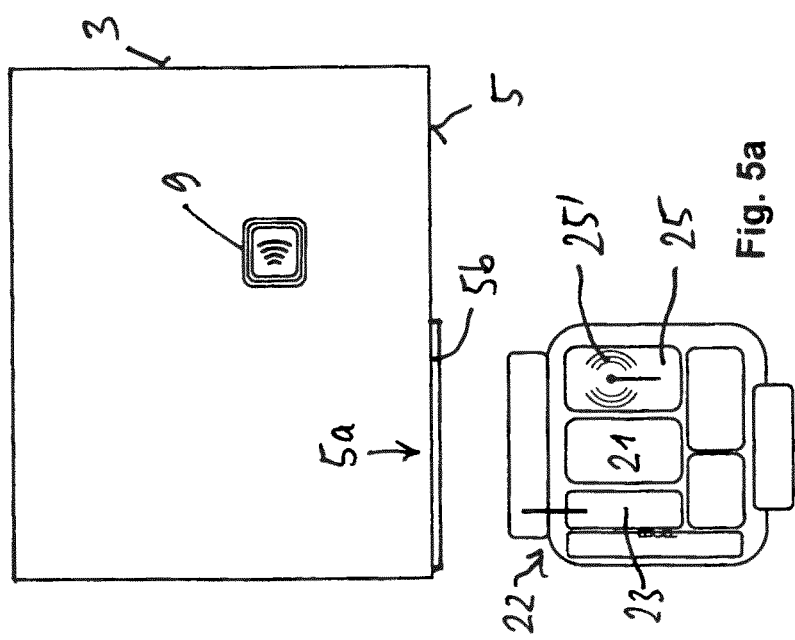
FIG. 5a shows yet another modification to the preceding embodiments before the beam-shape control device is installed in the antenna housing.

Finally, reference is made to yet another modification according to FIGS. 5a and 5b, in which the RET unit and more particularly the multi-RET unit can be fully inserted into the inside 3a of the antenna housing 3 via an opening 5a provided on the antenna housing, preferably on the antenna flange, after the cover 5b has been removed, and can be connected thereby such that to a greater or lesser extent, only the lower connecting point or interface 13 of the RET unit is accessible from the outside. Here, too, the RFID transceiver antenna 25' is arranged directly adjacent to the RFID tag 9 which is housed in the antenna 1, and here, again, is primarily adjacent to the side wall 65, possibly also in the transition from the side wall 65 to the upper connection face 61.

It emerges from the above-mentioned embodiments that the read and write electronics unit 25 and more particularly the RFID receiver and/or transmitter antenna 25 are housed preferably directly adjacently for example to the attachment or connection side 61 or, in an opposing manner, adjacently to the communication connection side 65 or on a side wall 63 in the housing 29 of the RET unit or multi-RET unit, said side wall 63 preferably extending, but not having to extend, in the installation or insertion direction 31. If the receiver or transmitter antenna 25' is housed inside the housing 29 of the RET unit or multi-RET unit, for example on an inner wall of the housing, the housing has to consist of electromagnetically transmissive material, at least for the RFID transmitting and receiving frequency. However, at least the receiver and/or transmitter antenna 25' can likewise be positioned on the outside of the housing 29 of the RET unit or multi-RET unit, more particularly if the antenna is covered by an electromagnetically transmissive protective layer, which protects said antenna against environmental influences.

All the specific and relevant data relating to the antenna and/or the control of the antenna and/or for communication with the elements for the beam-shape control device in the antenna and/or also operating data or settings relating to the current operation are stored intrinsically on the above-mentioned RFID tag or are additionally stored during operation and are read out at any time as required.

Primarily, data relating to the antenna type used and also the frequency-specific data are permanently stored on the RFID tag. Confusion of specific configuration data and configuration values is thus eliminated, as is necessary for communication with and control of a connected or attached RET unit and the antenna-specific construction. This also applies to the additional data and values. When installing an RET system, confusion between the RET and the antenna-specific configuration data and values, including the additional data and values, can thus be precluded.

In addition, the individual frequency bands can be unambiguously assigned to the individual RET sub-units. A multi-beam-shape control device in the form of a multi-RET specifically consists of a plurality of sub-units, which form what are known as virtual RET units.

In addition, as mentioned above, an RFID tag 9 of this type can be used as a data storage means, for example for data generated during operation. Operating parameters such as down-tilt angle, extreme temperatures, adjustment cycles, acceleration, etc. can thus be stored. The RFID tag thus functions as a log book for the antenna and can be read at any time as required.

If an RET unit is to be replaced, the newly attached RET unit or multi-RET unit can read, in addition to the antenna-specific data, the operating parameters stored on the RFID tag 9 from the RFID data carrier and is thus immediately ready for operation again.

The above-mentioned RFID technology thus reduces the downtime of the system to a minimum.

In particular, the combination of the above-mentioned RFID tag 9, the antenna 1, more particularly in the form of the mobile communications antenna 1, and the beam-shape or multi-beam-shape control device (in the form of the RET unit or multi-RET unit) forms a system, the configuration of which can be stored in the above-mentioned RFID tag 9, for example in the form of the set down-tilt angle per band, that is to say the assignment of the individual frequency bands to the network operators/primaries (which share an antenna etc.), of which there is optionally a plurality, and can be requested therefrom at any time as required and thus can be read out.

Each RFID tag 9 positioned in the region of an antenna 1 can preferably have a readable serial number which is unique worldwide, that is to say what is known as an individual identification number RFID which does not occur multiple times, which can also be used, inter alia, to impede possible piracy.

In summary, it can thus be stated that the above-mentioned RFID tag can be installed or connected in or to the antenna, the above-mentioned RET unit and more particularly the multi-RET unit can be introduced and connected either in part or completely in the antenna, or can be mounted on the outside of the antenna.

The read electronics unit capable of reading and preferably also of writing to the installed tag, and preferably also a write electronics unit, which also contains the above-mentioned transmitter and also the receiver antenna preferably in an antenna operating as a transceiver antenna, is located in the above-mentioned RET unit. Preferably, it should merely be ensured that in all the variants, the RET unit and more particularly the multi-RET unit is mounted such that the read electronics unit integrated into the beam-shape control device, that is to say, more particularly, the integrated receiver antenna, and preferably the transceiver antenna, is positioned relative to the RFID tag such that bidirectional communication between the beam-shape control device RET or multi-RET and the connected RFID tag fixed to or in the antenna is made possible.

The tags and the associated RFID antenna can operate in all frequency bands which are suitable in principle, more particularly tags can be used which operate for example at 13.56 MHz. However, tags can likewise be used in combination with the write electronics unit, which operates at completely different frequencies. There are no limitations in this respect.

The invention claimed is:
1. Antenna for mobile communications comprising:
an antenna housing,
a plurality of antenna devices housed in the antenna housing,
a beam-shape control device connected to the antenna and comprising a microprocessor and a control device for carrying out beam shaping,
an RFID tag provided on the antenna,
the beam-shape control device comprising (a) a read electronics unit comprising an RFID receiver antenna and/or (b) a write electronics unit comprising an RFID transmitter antenna, the RFID tag provided on the antenna arranged in the receiving and/or transmitting region of the receiver and/or transmitter antenna, the antenna configured such that unidirectional communication with the RFID tag provided on the antenna is handled via the RFID receiver antenna, or bidirectional communication with said RFID tag is handled via the RFID receiver and transmitter antenna(s), and the RFID tag storing at least one of (a) configuration data for configuring the antenna and/or (b) operating data for operating the antenna and/or (c) data for operating the beam-shape control device, wherein the RFID tag is configured to store data relating to operating parameters in the manner of a log book, and wherein the RFID tag is configured to store operating parameters and/or settings relating to a down-tilt angle, relating to the temperature change and/or to extreme temperatures, relating to adjustment cycles and relating to accelerations which have occurred.

2. Antenna according to claim 1, wherein the beam-shape control device further comprises a housing, and the RFID receiver antenna or the RFID transmitter antenna is provided in the housing or on the outside of the housing of the beam-shape control device.

3. Antenna according to claim 1, wherein the beam-shape control device further comprises a housing, and the RFID receiver antenna or the RFID transmitter antenna is positioned on or adjacent to an attachment or connection side, inside or outside the housing of the beam-shape control device.

4. Antenna comprising:
an antenna housing,
a plurality of antenna devices housed in the antenna housing,
a beam-shape control device connected to the antenna and comprising a housing, a microprocessor and a control device for carrying out beam shaping,
an RFID tag provided on the antenna,
the beam-shape control device comprising a read electronics unit comprising an RFID receiver antenna and/or a write electronics unit comprising an RFID transmitter antenna,
the RFID tag provided on the antenna arranged in the receiving and/or transmitting region of the receiver and/or transmitter antenna,
the antenna configured such that unidirectional communication can be handled via the RFID receiver antenna, or bidirectional communication can be handled via the RFID receiver and transmitter antenna(s), and
the RFID tag storing configuration data for the antenna and/or operating data for the antenna and/or data for operating the beam-shape control device to be connected to the antenna,
wherein the RFID receiver antenna or the RFID receiver and transmitter antenna(s) is positioned on or adjacent to the communication connection side, inside or outside the housing of the beam-shape control device, which communication connection side is provided opposite the attachment or connection side on the housing of the beam-shape control device.

5. Antenna comprising:
an antenna housing,
a plurality of antenna devices housed in the antenna housing,
a beam-shape control device connected to the antenna and comprising a housing, a microprocessor and a control device for carrying out beam shaping,
an RFID tag provided on the antenna,
the beam-shape control device comprising a read electronics unit comprising an RFID receiver antenna and/or a write electronics unit comprising an RFID transmitter antenna,
the RFID tag provided on the antenna arranged in the receiving and/or transmitting region of the receiver and/or transmitter antenna,
the antenna configured such that unidirectional communication can be handled via the RFID receiver antenna, or bidirectional communication can be handled via the RFID receiver and transmitter antenna(s), and
the RFID tag storing configuration data for the antenna and/or operating data for the antenna and/or data for operating the beam-shape control device to be connected to the antenna,
wherein the RFID receiver antenna or the RFID receiver and transmitter antenna(s) is positioned on or adjacent to a side wall, inside or outside the housing of the beam-shape control device, which side wall extends between the attachment and connection side and the communication connection side provided opposite thereto.

6. Antenna comprising:
an antenna housing,
a plurality of antenna devices housed in the antenna housing,
a beam-shape control device connected to the antenna and comprising a microprocessor and a control device for carrying out beam shaping,
an RFID tag provided on the antenna,
the beam-shape control device comprising a read electronics unit comprising an RFID receiver antenna and/or a write electronics unit comprising an RFID transmitter antenna,
the RFID tag provided on the antenna arranged in the receiving and/or transmitting region of the receiver and/or transmitter antenna,
the antenna configured such that unidirectional communication can be handled via the RFID receiver antenna, or bidirectional communication can be handled via the RFID receiver and transmitter antenna(s), and
the RFID tag storing configuration data for the antenna and/or operating data for the antenna and/or data for operating the beam-shape control device to be connected to the antenna,
wherein the antenna housing comprises a connection and interface side, and the RFID tag is positioned on this connection and interface side of the antenna housing.

7. Antenna according to claim 1, wherein the RFID tag is configured to store new information from the RFID receiver antenna and/or transmitter antenna.

8. Antenna according to claim 1, wherein the RFID tag is configured to store antenna-specific configuration data and antenna-specific supplementary operating data.

9. Antenna according to claim 4, wherein the RFID tag is configured to store data relating to operating parameters in the manner of a log book.

10. Antenna according to claim 4, wherein the RFID tag is configured to store operating parameters and/or settings relating to a down-tilt angle, relating to the temperature change and/or to extreme temperatures, relating to adjustment cycles and relating to accelerations which have occurred.

11. The antenna of claim 1 wherein the RFID receiver antenna and RFID transmitter antenna comprise a single common RFID transceiving antenna.

12. Antenna according to claim 4, wherein the RFID receiver antenna or the RFID transmitter antenna is provided in the housing or on the outside of the housing of the beam-shape control device.

13. Antenna according to claim 5, wherein the RFID receiver antenna or the RFID transmitter antenna is provided in the housing or on the outside of the housing of the beam-shape control device.

14. Antenna according to claim 6, wherein the beam-shape control device comprises a housing, and the RFID receiver antenna or the RFID transmitter antenna is provided in the housing or on the outside of the housing of the beam-shape control device.

15. Antenna according to claim 4, wherein the RFID receiver antenna or the RFID transmitter antenna is positioned on or adjacent to an attachment or connection side, inside or outside the housing of the beam-shape control device.

16. Antenna according to claim 5, wherein the RFID receiver antenna or the RFID transmitter antenna is positioned on or adjacent to an attachment or connection side, inside or outside the housing of the beam-shape control device.

17. Antenna according to claim 6, wherein the beam-shape control device comprises a housing, and the RFID receiver antenna or the RFID transmitter antenna is positioned on or adjacent to an attachment or connection side, inside or outside the housing of the beam-shape control device.

18. Antenna according to claim 4, wherein the RFID tag is configured to store new information from the RFID receiver antenna and/or transmitter antenna.

19. Antenna according to claim 5, wherein the RFID tag is configured to store new information from the RFID receiver antenna and/or transmitter antenna.

20. Antenna according to claim 6, wherein the RFID tag is configured to store new information from the RFID receiver antenna and/or transmitter antenna.

21. Antenna according to claim 4, wherein the RFID tag is configured to store antenna-specific configuration data and antenna-specific supplementary operating data.

22. Antenna according to claim 5, wherein the RFID tag is configured to store antenna-specific configuration data and antenna-specific supplementary operating data.

23. Antenna according to claim 6, wherein the RFID tag is configured to store antenna-specific configuration data and antenna-specific supplementary operating data.

24. Antenna according to claim 5, wherein the RFID tag is configured to store data relating to operating parameters in the manner of a log book.

25. Antenna according to claim 6, wherein the RFID tag is configured to store data relating to operating parameters in the manner of a log book.

26. Antenna according to claim 5, wherein the RFID tag is configured to store operating parameters and/or settings relating to a down-tilt angle, relating to the temperature change and/or to extreme temperatures, relating to adjustment cycles and relating to accelerations which have occurred.

27. Antenna according to claim 6, wherein the RFID tag is configured to store operating parameters and/or settings relating to a down-tilt angle, relating to the temperature change and/or to extreme temperatures, relating to adjustment cycles and relating to accelerations which have occurred.

28. The antenna of claim 4 wherein the RFID receiver antenna and RFID transmitter antenna comprise a single common RFID transceiving antenna.

29. The antenna of claim 5 wherein the RFID receiver antenna and RFID transmitter antenna comprise a single common RFID transceiving antenna.

30. The antenna of claim 6 wherein the RFID receiver antenna and RFID transmitter antenna comprise a single common RFID transceiving antenna.

* * * * *